Patented Nov. 1, 1949

2,486,417

UNITED STATES PATENT OFFICE 2,486,417

ALKYL- AND ARYL-ESTERS OF ALKYL BENZENESULFONIC ACIDS

Donald R. Jackson and William K. Langdon, Wyandotte, Mich., assignors to Wyandotte Chemicals Corporation, Wyandotte, Mich., a corporation of Michigan No Drawing. Application January 16, 1948, Serial No. 2,815

11 Claims. (Cl. 260—456)

The present invention relates to new and valuable chemical compounds comprising alkyl- and aryl-esters of alkylated benzenesulfonic acids; and to the process for the preparation thereof.

In the copending U. S. patent application of Donald R. Jackson, Serial No. 728,389, filed February 13, 1947, said Jackson being co-applicant herein, there is disclosed a novel process for synthesizing monohydroxy and polyhydroxy aliphatic alcohol esters of benzene- and naphthalene sulfonic acids. Such process involves the reaction of benzene- or naphthalene sulfonyl chloride with the aliphatic alcohol in the esterification reaction. We have now discovered that where the aryl sulfonyl chloride is alkylated in the benzene nucleus prior to such esterification reaction that new alkylated benzenesulfonic esters, having exceptional properties as plasticizing agents can be made according to the operating conditions of the process of the aforesaid copending Jackson application.

The alkylbenzene sulfonic acid esters of our invention are illustrated by the following general type formula:

where: R is an alkyl group containing 1 to 8 carbon atoms, which may be derived from both straight chain and branched chain acyclic hydrocarbons, and A is an alkyl or aryl group derived from mono- and polyhydroxy acyclic and cyclic hydrocarbon compounds, such as the normal alcohols, the alkylene glycols, and the phenols and homologues thereof.

Specific examples of the alkylbenzene sulfonic acid esters of our invention are:

n-Butyl octylbenzenesulfonate
Phenyl octylbenzenesulfonate
Phenyl xylenesulfonate
n-Butyl xylenesulfonate
n-Butyl sec-butylbenzenesulfonate
Phenyl sec-butylbenzenesulfonate In its broader concept, our invention involves the esterification of an alkylbenzene sulfonic acid with a mono- or polyhydroxy hydrocarbon compound. We prefer, however, to utilize the synthesizing procedure hereafter described.

The new chemical compounds: n-butyl octylbenzenesulfonate and phenyl octylbenzenesulfonate, in particular, possess unusual properties as plasticizing agents, particularly when used for such purpose with plastic materials of the polyvinyl chloride type.

Briefly outlined, the synthesizing procedure of our invention involves the alkylation of benzene, the chlorsulfonation of the alkylated benzene, followed by the reaction of the resultant alkylbenzenesulfonyl chloride with a hydrocarbon hydroxy compound such as an aliphatic alcohol or phenol. The alkyl- or aryl-, alkylbenzenesulfonate is obtained in good yield, the final esterification reaction being continued under conditions involving the presence of at least 200% molar excess of 35–50% strength caustic alkali, a reaction temperature of 35–50% C. and not over a 2:1 mol ratio of aliphatic alcohol or phenol to the alkylated benzenesulfonyl chloride. Preferably, the excess of caustic alkali is in the range of 300–1100% molar excess, viz., 4–12 mols of NaOH per mol of alkylbenzenesulfonyl chloride.

The following examples will enable those skilled in the art more readily to understand and practice our invention, such examples being set forth by way of detailed illustrations, but not necessarily in limitation of the scope of the invention.

EXAMPLE 1

A. Preparation of octylbenzene

Benzene in the amount of 1,560 grams (20 mols) was mixed with 650 grams of n-octanol (5 mols). An alkylating catalyst, boron trifluoride, and a dehydrating agent, phosphorous pentoxide (177.5 grams or 1.25 mol) was added to the mixture while warming on a water bath. Boron trifluoride was liberated slowly at the reflux temperature of the benzene. After refluxing vigorously for about 11 hours, evolution of the boron trifluoride had practically ceased. The mass was then poured into a 4 liter separatory funnel and the aqueous orthophosphoric acid layer was drawn off. The benzene layer was washed twice with water followed by a wash with a 10% sodium carbonate solution. After the sodium carbonate wash, the mixture was washed 3 times with water until neutral. The benzene was then stripped by distillation from a 3 liter flask up to a maximum pot temperature of 205° C. After stripping off the excess benzene (1,238 grams), the distilland was then subjected to a vacuum distillation at a 2 mm. Hg pressure and through a 10" long 29 mm. diameter glass helix packed column. There was obtained 778 grams of octylbenzene, representing 82% theoretical yield, on the basis of the n-octanol starting product.

B. Preparation of octylbenzenesulfonyl chloride

Octylbenzene obtained from part (A) of this example, in the amount of 768 grams, or 4.04 mols, was reacted with 1,404 grams of chlorsulfonic acid (9 mols) the latter being gradually added over a period of approximately 1 hour and the reaction temperature maintained in the range of 13–22° C. After completion of the chlorsulfonic acid addition, stirring of the reaction mass was continued for 22 minutes and the mass drowned in about 2 kilograms of ice. The resultant mixture was then further diluted with about 6 liters of water in a battery jar. The octylbenzenesulfonyl chloride settled out rapidly and the water layer was decanted. The octylbenzenesulfonyl chloride layer was washed 3 times in a 4 liter separatory funnel with about 2 liters of water, being allowed to stand overnight after the last wash. Residual water was stripped off the octylbenzenesulfonyl chloride layer at a temperature of 70° C. and under 5 mm. Hg pressure. The dewatered distilland was mixed with 270 grams of "Retrol" clay and filtered, representing a yield of 71.6%, based on the octylbenzene starting product.

C. *Preparation of n-butyl octylbenzenesulfonate* n-Butanol in the amount of 165 grams (2.25 mols) and 720 grams of a 50% NaOH solution (equivalent to 9 mols of NaOH anhydrous basis) and 180 grams of water were combined in a 2 liter 3 necked flask equipped with a thermometer, stirrer and addition funnel. With the addition of the dilution water, the final concentration of the NaOH became equivalent to 40%. Octylbenzenesulfonyl chloride from part (B) of this example was then added through the funnel to the first prepared mixture, and in the amount of 433 grams or 1.5 mols over a period of 25 minutes. The temperature, during such octylbenzenesulfonyl chloride addition was maintained in the range of 35.5-40° C. Additional 40% NaOH solution was then added to the esterification reaction mixture in an amount sufficient to raise the total NaOH content to a 12:1 mol ratio on the basis of octylbenzenesulfonyl chloride starting product. The reaction mixture was then transferred to an 8 liter battery jar, 2 liters of benzene were added and the mixture stirred for 2 hours at room temperature. There was then added 4 liters of water, and after standing for about 30 minutes the upper benzene layer separated out. The lower aqueous layer was drawn off with a suction leg and the remaining benzene layer was washed twice with water and then transferred to a 4 liter separatory funnel. After 3 extractions with 1.5 liter portions of water, the aqueous portion was observed to be clear and neutral. After a period of standing, residual benzene was stripped from the n-butyl octylbenzenesulfonate layer by distilling at atmospheric pressure and then by warming to 110° C. at 1-3 mm. Hg pressure. There was obtained 490 grams of n-butyl octylbenzenesulfonate of the formula:

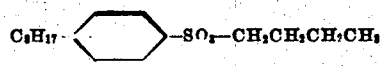

which had the appearance of a clear brown oil. This represented a 79% theoretical yield based on octylbenzenesulfonyl chloride starting product. The analysis of the n-butyl octylbenzenesulfonate was as follows:

| | |
|---|---|
| Saponification number | [1]168 |
| Sulfur  per cent | 9.73 |
| Chloride  do | 0.004 |
| Free acidity as $H_2SO_4$  do | 0.02 |
| Density at 25° C.  g./cc | 1.021 |
| Viscosity at 25° C. (centipoise) | 45.6 |
| Solubility: g./100 g. $H_2O$ at 25° C. | <0.005 |
| Solubility: g.$H_2O$/100 g. compound at 25° C. | 0.05 |

[1] Theoretical 172.

EXAMPLE 2

A. *Preparation of octylbenzenesulfonyl chloride* n-Octylbenzene prepared according to part (A) of Example 1, in the amount of 1,330 grams (7 mols) was chlorsulfonated with 2,440 grams of chlorsulfonic acid (21 mols), the latter being added over a period of 68 minutes and the temperature being maintained in the range of 10-13° C. After the completion of such addition, stirring was continued for 22 minutes and the mixture was then poured onto approximately 4 kilograms of cracked ice, thereafter diluted with 15 liters of tap water, and after standing for 30 minutes the upper aqueous layer was siphoned off and the remaining oily layer transferred to a 4 liter separatory funnel where it was washed 4 times with 1.5 liter portions of water, or until the wash water was neutral. After standing overnight, the oily layer, having a slightly emulsified appearance, was then stripped of water, employing a maximum distillation pot temperature of 40° C. at a pressure of 5 mm. Hg pressure. There was obtained 1449.5 grams of octylbenzenesulfonyl chloride product which was dark brown in color. This product was then stirred at room temperature with 30 grams of "Retrol" clay and then filtered with "Celite" filter aid. There was obtained 1457.5 grams of filtered, decolorized octylbenzenesulfonyl chloride representing a 72.2% theoretical yield on the basis of octylbenzene starting product.

B. *Preparation of phenyl octylbenzenesulfonate*

The octylbenzenesulfonyl chloride obtained from part (A) of this example in the amount of 576 grams (2 mols) was added to a previously combined mixture of 640 grams of 50% NaOH solution (8 mols), 160 grams of water (thereby adjusting NaOH concentration to 40%) and 262 grams (3 mols) of phenol, the latter mixture being contained in a 3 necked, 3 liter flask equipped similarly to that previously described in Example 1 (C). The octylbenzenesulfonyl chloride addition was made over a period of 30 minutes, with stirring, and such stirring was continued for an additional 45 minutes, the temperature being maintained in the range of 37-41° C. On transferring the reaction mass to a 2 liter separatory funnel, from the bottom of which a clear, light amber colored water soluble layer was drawn off, the remaining oily layer was washed with 1 liter portions of tap water until the pH of the wash water was reduced to 7.5. The crude phenyl octylbenzenesulfonate was then transferred to a 1-liter distilling flask and dehydrated under reduced pressure. There was obtained 346 grams of dehydrated phenyl octylbenzenesulfonate, of the formula:

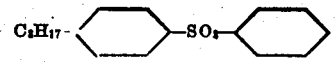

representing an 81.6% theoretical yield based on octylbenzenesulfonyl chloride starting product. The phenyl octylbenzenesulfonate had the following analysis:

| | |
|---|---|
| Saponification number | [1]158 |
| Sulfur  per cent | 9.12 |
| Chloride  do | 0.005 |
| Free acidity as $H_2SO_4$  do | 0.02 |
| Density at 25° C.  g./cc | 1.084 |
| Viscosity at 25° C. (centipoise) | 1.22 |
| Solubility: g./100 g. $H_2O$ at 25° C. | <0.005 |
| Solubility: g. $H_2O$/100 g. compound at 25° C. | 0.08 |

[1] Theoretical 162.

The n-butyl octylbenzenesulfonate product of Example 1 and the phenyl octylbenzenesulfonate product of Example 2 were tested for plasticizing properties by being made up into a composition of 2 parts of synthetic resin to 1 part of plasticizer, such synthetic resin being polyvinyl chloride. Tests for plasticizing properties showed that these two octylbenzenesulfonate esters possessed outstanding plasticizing properties of strength, low water absorption and low volatility. The test results are shown in the following table, where in order to obtain a better appreciation, and to more easily comprehend the value of such plasticizing properties, corresponding figures are given for a polyvinyl chloride synthetic resin wherein the heretofore well known and outstanding plasticizing agent, di-2-ethylhexyl phthalate plasticizing agent has been employed as a control.

Table

| Plasticing Agent | Tensile Strength | Tear Strength | $H_2O$ Absorption (1 day at 25° C.) | (Percent Weight Loss at 70° C. for 1 day) |
| --- | --- | --- | --- | --- |
| Phenyl Octylbenzenesulfonate (Ex. 2) | P. s. i. 2,987 | P. p. i. 563 | 0.097 | 0.07 |
| n-Butyl Octylbenzenesulfonate (Ex. 1) | 2,960 | 460 | 0.217 | 0.42 |
| Di-2-ethylhexyl Phthalate (control) | 2,837 | 439 | 0.144 | 0.16 |

EXAMPLE 3

*Preparation of phenyl xylenesulfonate*

Xylenesulfonyl chloride (i. e. di-methylbenzene sulfonyl chloride) in the amount of 689 grams, and of a purity of 94.5% (3.18 mols on 100% basis) were reacted with 354 grams (3.77 mols) of phenol and 1,219 grams of 40% NaOH (12 mols). The xylenesulfonyl chloride was added over a period of 69 minutes, with continued stirring for 46 minutes. The temperature varied from a starting temperature of 34° C. to 48° C. when all of the xylenesulfonyl chloride was added.

The reaction mass consisted of a gummy light brown phase and an aqueous cloudy phase. The latter was poured off and the remaining phase was washed with 1 liter of water and transferred to a battery jar. Thereupon 4 liters of water were added, the mass stirred and the non-aqueous phase allowed to settle out. After withdrawal of the aqueous layer, the remaining product layer which had an emulsion-like appearance was washed repeatedly with 1 liter portions of cold water. Acidic wash water containing about 5 cc. of concentrated HCl per liter was then used, and after two washings, the wash water tested neutral. The product phase or non-aqueous phase was then filtered through "Celite" filter aid and the filtrate distilled in a falling-film type of stripping still. A clear, brown colored product, phenyl xylenesulfonate of the formula:

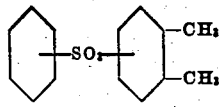

was obtained in the amount of 833 grams. This represented an 80% yield based upon the amount of xylenesulfonyl chloride starting product. The phenyl xylenesulfonate product had the following analysis:

Saponification number
  (average of duplicate test) _____ [1] 214.5
Specific gravity at 25° C. _____ 1.210
Acidity as $Na_2O$
  (phenolphthalein) _____ per cent__ 0.005
Qualitative tests for phenol:
  Ferric chloride _____ Negative
  Nitrous acid _____ Negative

[1] Theoretical 214.

EXAMPLE 4

*Preparation of n-butyl xylenesulfonate*

The ingredients employed for this synthesis were as follows:

Xylenesulfonyl chloride (97.1%
  purity) _____ 552.9 grams
  or 2.6 mols
n-Butanol _____ 220.9 grams
  or 3.0 mols
Caustic soda, 40% concentration __ 1040 grams
  or 10.4 mols The caustic soda and n-butanol were mixed and cooled before adding the xylenesulfonyl chloride. The reaction vessel employed was an enameled pail with a 4 blade paddle type stirrer. The temperature was maintained in the range of 33–39 C. during the addition of all but the first 60 cc. of the xylenesulfonyl chloride. The xylenesulfonyl chloride was added over a period of 23 minutes, at which point the mixture was of a smooth texture, changing to a mushy consistency, but of good stirring properties. The stirring was continued for a period of 53 minutes after the complete addition of the xylenesulfonyl chloride. The reaction mass was diluted with 2 liters of water, the upper, non-aqueous layer transferred to a 1.5 liter beaker and washed with 500 ml. portions of cold water until the wash water tested neutral. Some of the product was emulsified between the main portion and the aqueous layer, and this emulsified portion was twice put through the falling-film type of dehydrating column yielding about 10 grams of amber brown oil product which was added to the main product portion of 465 grams, giving a total of 475 grams of product. The yield of n-butyl xylenesulfonate of the chemical formula:

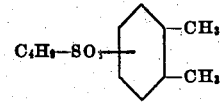

was 75.5% based on the xylenesulfonyl chloride starting product. Its analysis was as follows:

Saponification number (average of duplicate tests) _____ [1] 234
Specific gravity at 25° C. _____ 1.117
Index of refraction at 25° C. _____ 1.5074

[1] Theoretical 232.

EXAMPLE 5

*Preparation of n-butyl sec.-butyl benzenesulfonate*

The ingredients employed in this synthesis were as follows:

Sec.-butyl benzenesulfonyl chloride (94.3% purity) _____ 761 grams
  or 3.1 mols
n-Butanol _____ 232 grams
  or 3.1 mols
Caustic soda (40% concentration) _____ 12 grams
  or 12 mols The esterification reaction was conducted in a manner similar to that employed in Example 4, the sec.-butyl benzenesulfonyl chloride being added over a period of 46 minutes, followed by a continued stirring of the reaction mass for 43 minutes. After separation and water washing of the reaction product, followed by filtering through "Celite" and dehydration in the falling-film type of distillation column, there was obtained a 69.8% yield, based on sec.-butyl benzenesulfonyl chloride starting product, of n-butyl sec.-butyl benzenesulfonate of the chemical formula:

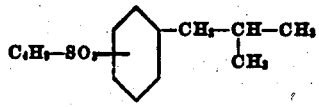

This ester had the following analysis:

Saponification number (average of duplicate tests) _____ [1] 206.5
Specific gravity at 25° C. _____ 1.077
Index of refraction at 25° C. _____ 1.5020

[1] Theoretical 207.5.

EXAMPLE 6

*Preparation of phenyl sec.-butyl benzenesulfonate*

The ingredients employed in this synthesis were as follows:

Sec.-butyl benzenesulfonyl chloride (98 purity) _____ 786 grams or 3.30 mols
Phenol (88% concentration) ____ 322 grams or 3.0 mols
Caustic soda (41.4% concentration) _____ 1160 grams or 12.0 mols The sec.-butyl benzenesulfonyl chloride was added over a period of 41 minutes, followed by continued stirring for a period of 33 minutes. The maximum temperature of the reaction mass was observed to be 37° C. After water washing of the reaction mass, dehydration in the falling-film type of still, there was obtained a 77.2% yield (based on sec.-butyl benzenesulfonyl chloride) of phenyl sec.-butyl benzenesulfonate of the chemical formula:

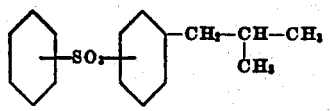

This product had the following analysis:

Saponification number (average of duplicate tests) _____ [1] 191
Specific gravity at 25° C. _____ 1.612
Index of refraction at 25° C. _____ 1.5498

[1] Theoretical 193.3.

Other modes of applying the principle of our invention may be employed, changes being made as regards to the details described, provided the features stated in any of the following claims or the equivalent of such be employed.

We, therefore, particularly point out and distinctly claim as our invention:

1. The process of reacting alkylbenzenesulfonyl chloride with a hydroxy compound selected from the group consisting of normal aliphatic alcohols, alkylene glycols, phenols and homologues of phenols, such reaction being conducted in the presence of 35–50% caustic alkali, at a temperature of 35–50° C., said caustic alkali being present in at least a 200% molar excess, and said hydrocarbon hydroxy compound being present in the amount of not over 2 mols per mol of alkylbenzenesulfonyl chloride.

2. The process of claim 1 wherein the hydrocarbon hydroxy compound is n-butanol.

3. The process of claim 1 wherein the hydrocarbon hydroxy compound is phenol.

4. The process which consists in alkylating benzene with an alkyl group containing from 1 to 8 carbon atoms, chlorsulfonating the resultant alkylbenzene, and then reacting the alkylbenzenesulfonyl chloride with a hydroxy compound selected from the group consisting of normal aliphatic alcohols, alkylene glycols, phenols and homologues of phenols, such reaction being conducted in the presence of 35–50% caustic alkali, at a temperature of 35–50° C., said caustic alkali being present in at least a 200% molar excess, and said hydrocarbon hydroxy compound being present in the amount of not over 2 mols per mol of alkylbenzenesulfonyl chloride.

5. The process of claim 4 wherein the hydrocarbon hydroxy compound is n-butanol.

6. The process of claim 4 wherein the hydrocarbon hydroxy compound is phenol.

7. The process which consists in alkylating benzene with an octyl group, chlorsulfonating the resultant octylbenzene, treating the octylbenzenesulfonyl chloride with clay and filtering, and then reacting the octylbenzenesulfonyl chloride with n-butanol in the presence of 35–50% NaOH at a temperature of 35–50° C., the NaOH being present in approximately a 1100% molar excess, and the n-butanol being present in an amount not over 2 mols per mol of octylbenzenesulfonyl chloride.

8. The process which consists in alkylating benzene with an octyl group, chlorsulfonating the resultant octylbenzene, treating the octylbenzenesulfonyl chloride with clay and filtering, and then reacting the octylbenzenesulfonyl chloride with phenol in the presence of 35–50% NaOH at a temperature of 35–50° C., the NaOH being present in approximately a 300% molar excess, and the phenol being present in an amount not over 2 mols per mol of octylbenzenesulfonyl chloride.

9. As a new chemical compound, n-butyl octylbenzenesulfonate.

10. As a new chemical compound, phenyl octylbenzenesulfonate.

11. Octylbenzenesulfonic acid esters of the formula:

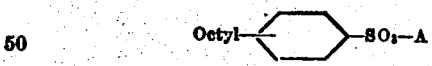

where A is a hydrocarbon radical selected from the group consisting of normal alkyl, phenyl and homologues of phenyl.

DONALD R. JACKSON.
WILLIAM K. LANGDON.

REFERENCES CITED

The following references are of record in the file of this patent:

UNITED STATES PATENTS

| Number | Name | Date |
|---|---|---|
| 1,924,396 | Carswell | Aug. 29, 1933 |
| 2,017,803 | Isham | Oct. 15, 1935 |
| 2,227,708 | Cordier | Jan. 7, 1941 |
| 2,266,141 | Adams | Dec. 16, 1941 |
| 2,340,701 | Schlichting et al. | Feb. 1, 1944 |